US011781505B2

(12) United States Patent
Lord et al.

(10) Patent No.: US 11,781,505 B2
(45) Date of Patent: *Oct. 10, 2023

(54) LOW PRESSURE RATIO FAN ENGINE HAVING A DIMENSIONAL RELATIONSHIP BETWEEN INLET AND FAN SIZE

(71) Applicant: RAYTHEON TECHNOLOGIES CORPORATION, Farmington, CT (US)

(72) Inventors: Wesley K. Lord, South Glastonbury, CT (US); Robert E. Malecki, Storrs, CT (US); Yuan J. Qiu, Glastonbury, CT (US); Becky E. Rose, Colchester, CT (US); Jonathan Gilson, W. Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/198,651

(22) Filed: Mar. 11, 2021

(65) Prior Publication Data

US 2021/0285403 A1 Sep. 16, 2021

Related U.S. Application Data

(63) Continuation of application No. 15/887,183, filed on Feb. 2, 2018, now Pat. No. 11,015,550, which is a
(Continued)

(51) Int. Cl.
*F02K 3/068* (2006.01)
*F01D 25/24* (2006.01)
*F02C 7/04* (2006.01)

(52) U.S. Cl.
CPC .............. *F02K 3/068* (2013.01); *F01D 25/24* (2013.01); *F02C 7/04* (2013.01); *F05D 2220/36* (2013.01);
(Continued)

(58) Field of Classification Search
CPC . F01D 5/02; F01D 5/141; F01D 15/12; F01D 17/105; F02C 7/04; F02C 7/045;
(Continued)

(56) References Cited

U.S. PATENT DOCUMENTS 2,258,792 A 10/1941 New
2,936,655 A 5/1960 Peterson et al.
(Continued)

FOREIGN PATENT DOCUMENTS

EP 0791383 A1 8/1997
EP 1142850 A1 10/2001
(Continued)

OTHER PUBLICATIONS

Whitaker, R. (1982). ALF 502: plugging the turbofan gap. Flight International, p. 237-241, Jan. 30, 1982.
(Continued)

*Primary Examiner* — Christopher R Legendre
(74) *Attorney, Agent, or Firm* — Carlson, Gaskey & Olds, P.C.

(57) ABSTRACT

A gas turbine engine assembly includes, among other things, a fan section including a fan, the fan including a plurality of fan blades, a diameter of the fan having a dimension D that is based on a dimension of the fan blades, a turbine section including a high pressure turbine and a low pressure turbine, the low pressure turbine driving the fan, a nacelle including an inlet portion forward of the fan, a length of the inlet portion having a dimension L, and a dimensional relationship of L/D between 0.30 and 0.40.

30 Claims, 3 Drawing Sheets

Related U.S. Application Data continuation of application No. 14/091,862, filed on Nov. 27, 2013, now Pat. No. 9,932,933, which is a continuation-in-part of application No. 13/721,095, filed on Dec. 20, 2012, now Pat. No. 9,920,653.

(60) Provisional application No. 61/884,325, filed on Sep. 30, 2013.

(52) U.S. Cl.
CPC .................. *F05D 2240/303* (2013.01); *F05D 2260/40311* (2013.01); *F05D 2260/96* (2013.01); *Y02T 50/60* (2013.01)

(58) Field of Classification Search
CPC ... F02K 3/04; F02K 3/06; F02K 3/065; F02K 3/068; F05D 2220/36
See application file for complete search history.

(56) References Cited

U.S. PATENT DOCUMENTS

| | | |
|---|---|---|
| 3,021,731 A | 2/1962 | Stoeckicht |
| 3,194,487 A | 7/1965 | Tyler et al. |
| 3,287,906 A | 11/1966 | Mccormick |
| 3,352,178 A | 11/1967 | Lindgren et al. |
| 3,412,560 A | 11/1968 | Gaubatz |
| 3,494,129 A | 2/1970 | Krebs et al. |
| 3,532,129 A | 10/1970 | Ward et al. |
| 3,546,882 A | 12/1970 | Berkey et al. |
| 3,664,612 A | 5/1972 | Skidmore et al. |
| 3,735,593 A | 5/1973 | Howell |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark et al. |
| 3,843,277 A | 10/1974 | Ehrich |
| 3,892,358 A | 7/1975 | Gisslen |
| 3,932,058 A | 1/1976 | Harner et al. |
| 3,935,558 A | 1/1976 | Miller et al. |
| 3,946,830 A | 3/1976 | Kutney et al. |
| 3,988,889 A | 11/1976 | Chamay et al. |
| 4,130,872 A | 12/1978 | Haloff |
| 4,209,149 A | 6/1980 | Morris et al. |
| 4,220,171 A | 9/1980 | Ruehr et al. |
| 4,240,250 A | 12/1980 | Harris |
| 4,284,174 A | 8/1981 | Salvana et al. |
| 4,289,360 A | 9/1981 | Zirin |
| 4,478,551 A | 10/1984 | Honeycutt, Jr. et al. |
| 4,649,114 A | 3/1987 | Miltenburger et al. |
| 4,696,156 A | 9/1987 | Burr et al. |
| 4,722,357 A | 2/1988 | Wynosky |
| 4,827,712 A | 5/1989 | Coplin |
| 4,927,328 A | 5/1990 | Scoates et al. |
| 4,934,139 A | 6/1990 | Newton et al. |
| 4,979,362 A | 12/1990 | Vershure, Jr. |
| 5,058,617 A | 10/1991 | Stockman et al. |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,634,767 A | 6/1997 | Dawson |
| 5,642,985 A | 7/1997 | Spear et al. |
| 5,677,060 A | 10/1997 | Terentieva et al. |
| 5,778,659 A | 7/1998 | Duesler et al. |
| 5,857,836 A | 1/1999 | Stickler et al. |
| 5,915,403 A | 6/1999 | McConachie et al. |
| 5,915,917 A | 6/1999 | Eveker et al. |
| 5,966,525 A | 10/1999 | Manzi, Jr. et al. |
| 5,975,841 A | 11/1999 | Lindemuth et al. |
| 5,985,470 A | 11/1999 | Spitsberg et al. |
| 6,071,077 A | 6/2000 | Rowlands |
| 6,158,210 A | 12/2000 | Orlando |
| 6,223,616 B1 | 5/2001 | Sheridan |
| 6,315,815 B1 | 11/2001 | Spadaccini et al. |
| 6,317,877 B1 | 11/2001 | Hoffman, Jr. et al. |
| 6,318,070 B1 | 11/2001 | Rey et al. |
| 6,387,456 B1 | 5/2002 | Eaton, Jr. et al. |
| 6,517,341 B1 | 2/2003 | Brun et al. |
| 6,607,165 B1 | 8/2003 | Manteiga et al. |
| 6,708,711 B2 | 3/2004 | Surply et al. |
| 6,709,492 B1 | 3/2004 | Spadaccini et al. |
| 6,732,502 B2 | 5/2004 | Seda et al. |
| 6,814,541 B2 | 11/2004 | Evans et al. |
| 6,883,303 B1 | 4/2005 | Seda |
| 6,973,193 B1 | 12/2005 | Tse et al. |
| 7,021,042 B2 | 4/2006 | Law |
| 7,219,490 B2 | 5/2007 | Dev |
| 7,328,580 B2 | 2/2008 | Lee et al. |
| 7,374,403 B2 | 5/2008 | Decker et al. |
| 7,591,754 B2 | 9/2009 | Duong et al. |
| 7,632,064 B2 | 12/2009 | Somanath et al. |
| 7,662,059 B2 | 2/2010 | McCune |
| 7,797,944 B2 | 9/2010 | Morford et al. |
| 7,806,651 B2 | 10/2010 | Kennepohl et al. |
| 7,824,305 B2 | 11/2010 | Duong et al. |
| 7,828,682 B2 | 11/2010 | Smook |
| 7,882,694 B2 | 2/2011 | Suciu et al. |
| 7,926,260 B2 | 4/2011 | Sheridan et al. |
| 7,997,868 B1 | 8/2011 | Liang |
| 8,205,432 B2 | 6/2012 | Sheridan |
| 8,246,292 B1 | 8/2012 | Morin et al. |
| 8,402,739 B2 | 3/2013 | Jain et al. |
| 8,418,953 B2 | 4/2013 | Smith et al. |
| 8,449,247 B1 | 5/2013 | Hasel et al. |
| 8,459,035 B2 | 6/2013 | Smith et al. |
| 8,545,167 B2 | 10/2013 | Cheung |
| 8,601,786 B2 | 12/2013 | Hurwitz et al. |
| 8,650,854 B2 | 2/2014 | Migliaro, Jr. et al. |
| 8,726,632 B2 | 5/2014 | Morford et al. |
| 8,807,477 B2 | 8/2014 | Suciu et al. |
| 9,920,653 B2 | 3/2018 | Lord et al. |
| 9,932,933 B2 | 4/2018 | Lord et al. |
| 10,087,886 B2 | 10/2018 | Penda et al. |
| 11,015,550 B2 * | 5/2021 | Lord ..................... F01D 25/24 |
| 2004/0238687 A1 | 12/2004 | Jones et al. |
| 2005/0274103 A1 | 12/2005 | Prasad et al. |
| 2006/0228206 A1 | 10/2006 | Decker et al. |
| 2008/0003096 A1 | 1/2008 | Kohli et al. |
| 2008/0116009 A1 | 5/2008 | Sheridan et al. |
| 2008/0317588 A1 | 12/2008 | Grabowski et al. |
| 2009/0003997 A1 | 1/2009 | Jain et al. |
| 2009/0056306 A1 | 3/2009 | Suciu et al. |
| 2009/0056343 A1 | 3/2009 | Suciu et al. |
| 2009/0304518 A1 | 12/2009 | Kodama et al. |
| 2009/0314881 A1 | 12/2009 | Suciu et al. |
| 2010/0105516 A1 | 4/2010 | Sheridan et al. |
| 2010/0148396 A1 | 6/2010 | Xie et al. |
| 2010/0162683 A1 | 7/2010 | Grabowski et al. |
| 2010/0212281 A1 | 8/2010 | Sheridan |
| 2010/0218483 A1 | 9/2010 | Smith |
| 2010/0269512 A1 | 10/2010 | Morford et al. |
| 2010/0331139 A1 | 12/2010 | McCune |
| 2011/0159797 A1 | 6/2011 | Beltman et al. |
| 2011/0211943 A1 | 9/2011 | Belbeck et al. |
| 2011/0220217 A1 | 9/2011 | Bensilum |
| 2011/0293423 A1 | 12/2011 | Bunker et al. |
| 2012/0124964 A1 | 5/2012 | Hasel et al. |
| 2012/0171018 A1 | 7/2012 | Hasel et al. |
| 2012/0198816 A1 | 8/2012 | Suciu et al. |
| 2013/0195645 A1 | 8/2013 | Suciu et al. |
| 2015/0044028 A1 | 2/2015 | Lord et al. |
| 2015/0337762 A1 | 11/2015 | Penda et al. |
| 2016/0003145 A1 | 1/2016 | Qiu et al. |
| 2016/0061057 A1 | 3/2016 | Lord et al. |
| 2016/0108854 A1 | 4/2016 | Lord et al. |
| 2017/0190438 A1 | 7/2017 | Qiu et al. |
| 2017/0218975 A1 | 8/2017 | Bintz et al. |
| 2017/0298954 A1 | 10/2017 | Qiu et al. |
| 2021/0285403 A1 * | 9/2021 | Lord ..................... F02C 7/04 |

(56) References Cited

U.S. PATENT DOCUMENTS

FOREIGN PATENT DOCUMENTS

| EP | 0715066 | B1 | 12/2001 |
|---|---|---|---|
| EP | 1340903 | A2 | 9/2003 |
| EP | 1607603 | A2 | 12/2005 |
| EP | 2259115 | A2 | 12/2010 |
| EP | 2935788 | A1 | 10/2015 |
| EP | 2964924 | A1 | 1/2016 |
| GB | 1516041 | A | 6/1978 |
| GB | 2041090 | A | 9/1980 |
| GB | 2259115 | A | 3/1993 |
| GB | 2372019 | A | 8/2002 |
| GB | 2426792 | A | 12/2006 |
| WO | 0146944 | A1 | 6/2001 |
| WO | 2007038674 | A1 | 4/2007 |
| WO | 2014100081 | A1 | 6/2014 |
| WO | 2014137685 | A1 | 9/2014 |

OTHER PUBLICATIONS

Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines- Turbofan. Feb. 9, 2012.
Honeywell LF502. Jane's Aero-engines, Aero-engines- Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (Cat C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.
Boettcher, J. (2006). Noise certification workshop Session 2: Aircraft noise certification. Annex 16, vol. 1 and equivalent procedures. EASA. Bangkok. Nov. 2006. pp. 1-27.
Heidmann, M.F. (1979). Interim prediction method for fan and compressor source noise. NASA-TM X-71763. pp. 1-66.
Huff, D.L. (2007). Noise reduction technologies for turbofan engines. NASA/TM-2007-214495. pp. 1-10.
Seddon, J. and Goldsmith, E.L. (1999). Intake aerodynamics, 2nd ed. AIAA Education Series. pp. 318-321.
Submissions in the Opposition of European Patent Application No. 14850031.7 by Rolls-Royce plc dated Apr. 12, 2022.

Smith-Boyd, L. and Pike, J. (1986). Expansion of epicyclic gear dynamic analysis program. Prepared for NASA. NASA CR-179563. Aug. 1986. pp. 1-98.
Sowers, H.D. and Coward, W.E. (1978). QCSEE over-the-wing (OTW) engine acuostic design. NASA-CR-135268. Jun. 1, 1978. pp. 1-52.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Summons to attend oral proceedings for European Patent Application No. EP16204886.2, dated Oct. 6, 2020, 11 pages.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, p. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
Technical Report. (1977). Quiet Clean Short-haul Experimental Engine (QCSEE) Under-the-Wing (UTW) final design report. NASA-CR-134847. Jun. 1, 1977. pp. 1-697.
The International Preliminary Report on Patentability for PCT Application No. PCT/US2014/056203, dated Apr. 14, 2016.
Third Party Observations submitted for EP Application No. EP13864565.0 (EP2935788), by Rolls-Royce Pic, dated Sep. 5, 2019, 11 pages.
Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines- Turbofan. Nov. 2, 2009.
Turner, M. G., Norris, A., and Veres, J.P. (2004). High-fidelity three-dimensional simulation of the GE90. NASA/TM-2004-212981. pp. 1-18.

(56) References Cited

OTHER PUBLICATIONS

U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouser, M.E. (2003). Follow-on technology requirement study for advanced subsonic transport. NASA/CR-2003-212467. pp. 1-37.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
Zimbrick R. A., et al., "Investigation of Very High Bypass Ratio Engines for Subsonic Transports," Journal of Propulsion and Power, American Institute of Aeronautics and Astronautics, Jul. 1, 1990, vol. 6, No. 4, pp. 490-496.
Notice of Opposition in European Patent Application No. 13864565.0 (2935788) by Rolls-Royce plc dated Jun. 23, 2022.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Kramer J.J., "Quiet engine program: Detailed engine designs", NASA Technical Report, 1968, pp. 273-285.
Krantz, T.L. (1990). Experimental and analytical evaluation of efficiency of helicopter planetary stage. NASA Technical Paper. Nov. 1990. pp. 1-19.
Krauskopf, L. (2014). GE exec say avoided geared design in jet engine battle with Pratt. Reuters. Retrieved Jan. 4, 2017 from: http://www.reuters.com/article/us-general-electric-united-tech-engine-idUSKBNOHA2H620140915.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: a program to calculate design and off-design performance of gas turbines. Retrieved from: https://www.scribd.com/document/92384867/GasTurb9Manual.
Kurzke, J. (2012). GasTurb 12: Design and off-design performance of gas turbines. Retrieved from: https://www.scribd.com/document/153900429/GasTurb-12.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air. 2009, Orlando, Florida. pp. 145-153.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
Lecordix J.L., et al., "Design of an Advanced Nacelle for a Very High Bypass Ration Engine", Aeronautical Journal, Dec. 1992, pp. 387-394, 8 pages.
Lee, K.N. (2000). Current status of environmental barrier coatings for Si-Based ceramics. Surface and Coatings Technology 133-134, 2000. pp. 1-7.
Levintan, R.M. (1975). Q-Fan demonstrator engine. Journal of Aircraft. vol. 12( 8). Aug. 1975. pp. 658-663.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Liebeck, R.H., Andrastek, D.A., Chau, J., Girvin, R., Lyon, R., Rawdon, B.K., Scott, P.W et al. (1995). Advanced subsonic airplane design & economics studies. NASA CR-195443. Apr. 1995. pp. 1-187.
Litt, J.S. (2018). Sixth NASA Glenn Research Center propulsion control and diagnostics (PCD) workshop. NASA/CP-2018-219891. Apr. 1, 2018. pp. 1-403.
Lord, W.K., MacMartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.
Macisaac, B. and Langston, R. (2011). Gas turbine propulsion systems. Chichester, West Sussex: John Wiley & Sons, Ltd. pp. 260-265.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Manual. Student's Guide to Learning SolidWorks Software. Dassault Systemes—SolidWorks Corporation. pp. 1-156.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

(56) References Cited

OTHER PUBLICATIONS

Mattingly, J.D. (1996). Elements of gas turbine propulsion. New York, New York: McGraw-Hill, Inc. pp. 1-18, 60-62, 223-234, 462-479, 517-520, 757-767, and 862-864.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Mattingly, J.D. (1996). Elements of gas turbine propulsion. New York, New York: McGraw-Hill, Inc. pp. 8-15.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

McCracken, R.C. (1979). Quiet short-haul research aircraft familiarization document. NASA-TM-81149. Nov. 1, 1979. pp. 1-76.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N., "Civil Turbojet/Turbofan Specifications", 2005, retrieved from http://jet-engine.net/civtfspec.html , 8 pages.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Nanocor Technical Data for Epoxy Nanocomposites using Nanomer 1.30E Nanoclay. Nnacor, Inc. Oct. 2004.

NASA, 2004 NASA Seal/Secondary Air System Workshop. NASA/CP-2005-213655/vol. 1, Proceedings of a Conference held at Ohio Aerospace Institute Sponsored by NASA Glenn Research Center, Cleveland, OH, Nov. 9-10, 2004, p. 85.

NASA, 2004 NASA Seal/Secondary Air System Workshop, NASA/CP-2005-213655/vol. 1, Proceedings of a Conference held at Ohio Aerospace Institute sponsored by NASA Glenn Research Center, Cleveland, OH, Nov. 9-10, 2004, pp. 1-405.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Norton, M. and Karczub, D. (2003). Fundamentals of noise and vibration analysis for engineers. Press Syndicate of the University of Cambridge. New York: New York. p. 524.

Notice of Opposition of European Patent No. EP3052789 by Safran Aircraft Engines, dated Mar. 19, 2020, 20 pages.

Notice of Opposition of European Patent No. EP3181863, by Safran Aircraft Engines, dated Jan. 9, 2019, 69 pages.

Oates, G.C. (Ed). (1989). Aircraft propulsion systems and technology and design. Washington, D.C .: American Institute of Aeronautics, Inc. pp. 341-344.

Parametric study of STOL short-haul transport engine cycles and operational techniques to minimize community noise impact. NASA-CR-114759. Jun. 1, 1974. pp. 1-398.

Parker, R.G. and Lin, J. (2001). Modeling, modal properties, and mesh stiffness variation instabilities of planetary gears. Prepared for NASA. NASA/CR-2001-210939. May 2001. pp. 1-111.

Patent Owner's Preliminary Response in U.S. Pat. No. 9,920,653, *General Electric Company*, Petitioner, v. *United Technologies Corp.*, Patent Owner: IPR2019-01489, Filed Nov. 25, 2019. pp. 1-5.

Petition for Inter Partes Review of U.S. Pat. No. 9,920,653, *General Electric Company*, Petitioner, v. *United Technologies Corporation*, Patent Owner: IPR2019-01489, Aug. 12, 2019, 104 pages.

Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Product Brochure. Garrett TFE731. Allied Signal. Copyright 1987. pp. 1-24.

Pyrograf-III Carbon Nanofiber. Product guide. Retrieved Dec. 1, 2015 from: http://pyrografproducts.com/Merchant5/merchant.mvc?Screen=cp_nanofiber.

QCSEE ball spline pitch-change mechanism whirligig test report. (1978). NASA-CR-135354. Sep. 1, 1978. pp. 1-57.

QCSEE hamilton standard cam/harmonic drive variable pitch fan actuation system derail design report. (1976). NASA-CR-134852. Mar. 1, 1976. pp. 1-172.

QCSEE main reduction gears bearing development program final report. (1975). NASA-CR-134890. Dec. 1, 1975. pp. 1-41.

QCSEE over-the-wing final design report. (1977). NASA-CR-134848. Jun. 1, 1977. pp. 1-503.

QCSEE over-the-wing propulsion system test report vol. III—mechanical performance. (1978). NASA-CR-135325. Feb. 1, 1978. pp. 1-112.

QCSEE Preliminary analyses and design report. vol. 1. (1974). NASA-CR-134838. Oct. 1, 1974. pp. 1-337.

QCSEE preliminary analyses and design report. vol. II. (1974). NASA-CR-134839. Oct. 1, 1974. pp. 340-630.

QCSEE the aerodynamic and mechanical design of the QCSEE under-the-wing fan. (1977). NASA-CR-135009. Mar. 1, 1977. pp. 1-137.

QCSEE the aerodynamic and preliminary mechanical design of the QCSEE OTW fan. (1975). NASA-CR-134841. Feb. 1, 1975. pp. 1-74.

QCSEE under-the-wing engine composite fan blade design. (1975). NASA-CR-134840. May 1, 1975. pp. 1-51.

QCSEE under-the-wing engine composite fan blade final design test report. (1977). NASA-CR-135046. Feb. 1, 1977. pp. 1-55.

QCSEE under-the-wing engine composite fan blade preliminary design test report. (1975). NASA-CR-134846. Sep. 1, 1975. pp. 1-56.

QCSEE under-the-wing engine digital control system design report. (1978). NASA-CR-134920. Jan. 1, 1978. pp. 1-309.

(56) References Cited

OTHER PUBLICATIONS

Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
Rolls-Royce M45H. Jane's Aero-engines, Aero-engines- Turbofan. Feb. 24, 2010.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France. pp. 1-595.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report-168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Seader, J.D. and Henley, E.J. (1998). Separation process principles. New York, NY: John Wiley & Sons, Inc. pp. 722-726 and 764-771.
Shah, D.M. (1992). MoSi2 and other silicides as high temperature structural materials. Superalloys 1992. The Minerals, Metals, & Materials Society. pp. 409-422.
Shorter Oxford English Dictionary, 6th Edition. (2007), vol. 2, N-Z, pp. 1888.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Singh, A. (2005). Application of a system level model to study the planetary load sharing behavior. Jounal of Mechanical Design. vol. 127. May 2005. pp. 469-476.
Singh, B. (1986). Small engine component technology (SECT) study. NASA-175079. Mar. 1, 1986. pp. 1-102.
Singh, R. and Houser, D.R. (1990). Non-linear dynamic analysis of geared systems. NASA-CR-180495. Feb. 1, 1990. pp. 1-263.
Smith, C.E., Hirschkron, R., and Warren, R.E. (1981). Propulsion system study for small transport aircraft technology (STAT). Final report. NASA-CR-165330. May 1, 1981. pp. 1-216.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Declaration of John Eaton, Ph.D. In re U.S. Pat. No. 8,869,568, Executed Mar. 28, 2016, pp. 1-87.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Disclaimer in Patent Under 37 CFR 1 321(a) for U.S. Pat. No. 9,920,653 of Claims 1-20. Filed Nov. 25, 2019, 4 pages.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
EPO Official Letter for European Patent Application No. 13684565.0 dated Aug. 17, 2018, 5 pages.
Extended European Search Report for Application No. EP13864565.0, dated Dec. 16, 2015, 7 pages.
Extended European Search Report for Application No. EP16193884.0, dated Mar. 7, 2017, 24 pages.
Extended European Search Report for Application No. EP19173882.2, dated Aug. 12, 2019, 13 pages.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Gates, D. Bombardier flies at higher market. Seattle Times. Jul. 13, 2008. pp. C6.
General Electric GE90, "Jane's Aero-Engines", Jane's by IHS Markit. Nov. 1, 2010, 12 pages.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.

(56) References Cited

OTHER PUBLICATIONS

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Graham-Rowe D., "More Efficient Jet Engine Gets in Gear", MIT Technology Review, Dec. 13, 2010, retrieved from internet, Mar. 13, 2017 from: https://www.technologyreview.eom/s/421992/more-efficient-jet-engine-gets-in-gear/, 6 pages.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group Limited. pp. 510-512.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., Berton, J.J., Fisher, K.L., Haller, W.J., Tong, M. T., and Thurman, D.R. (2009). Analysis of turbofan design options for an advanced single-aisle transport aircraft. American Institute of Aeronautics and Astronautics. pp. 1-13.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
2003 NASA seal/secondary air system workshop. (2003). NASA/CP-2004-212963/vol. 1. Sep. 1, 2004. pp. 1-408.
About GasTurb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
AGMA Standard (1997). Design and selection of components for enclosed gear drives. lexandria, VA: American Gear Manufacturers Association. pp. 1-48.
AGMA Standard (1999). Flexible couplings—Mass elastic properties and other characteristics. Alexandria, VA: American Gear Manufacturers Association. pp. 1-46.
AGMA Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Attestation of Jean-Loic Lecordix signed Jan. 9, 2020, Notice of Opposition for European Patent No. 3181863 (16204886.2) dated Jan. 9, 2020, 6 pages.
Aviadvigatel D-110. Jane's Aero-engines, Aero-engines- Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Berton, J.J. and Guynn, M.D. (2012). Multi-objective optimization of a turbofan for an advanced, single-aisle transport. NASA/TM-2012-217428. pp. 1-26.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-84.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing engine acoustic data. NASA-TM-82691. May 1, 1982. pp. 1-28.
Bloomer, H.E. and Samanich, N.E. (1982). QCSEE under-the-wing enging-wing-flap aerodynamic profile characteristics. NASA-TM-82890. Sep. 1, 1982. pp. 1-48.
Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Bornstein, N. (1993). Oxidation of advanced intermetallic compounds. Journal de Physique IV, 1993, 03 (C9), pp. C9-367-C9-373.
Brennan, P.J. and Kroliczek, E.J. (1979). Heat pipe design handbook. Prepared for National Aeronautics and Space Administration by B & K Engineering, Inc. Jun. 1979. pp. 1-348.
Brines, G.L. (1990). The turbofan of tomorrow. Mechanical Engineering: The Journal of the American Society of Mechanical Engineers, 108(8), 65-67.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference. pp. 1-10.
Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

(56) References Cited

OTHER PUBLICATIONS

Civil Turbojet/Turbofan Specifications, Jet Engine Specification Database (Apr. 3, 2005).
Clarke, D.R. and Levi, C.G. (2003). Materials design for the next generation thermal barrier coatings. Annual. Rev. Mater. Res. vol. 33. 2003. pp. 383-417.
Cramoisi, G. Ed. (2012). Death in the Potomac: the crash of Air Florida Flight 90. Air Crash Investigations. Accident Report NTSB/AAR-82-8. p. 45-47.
Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-12.
Daly, M. Ed. (2010). Jane's Aero-Engine. Issue Twenty-seven. Mar. 2010. p. 633-636.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.
Datasheet. CF6-80C2 high-bypass turbofan engines. Retreived from https://geaviation.com/sites/default/files/datasheet-CF6-80C2.pdf.
Datasheet. CFM56-5B for the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-617.
Davis D.G.M., "Variable-Pitch Fans", Flight International, No. 3345, vol. 103, Apr. 19, 1973, pp. 615-619.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Han, J., Dutta, S., and Ekkad, S.V. (2000). Gas turbine heat transfer and cooling technology. New York, NY: Taylor & Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp. 1-13.

Hess, C. (1998). Pratt & Whitney develops geared turbofan. Flug Revue 43(7). Oct. 1998.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.
Hingorani S.S., "Towards a Quieter Future: Next frontier for Aircraft Engine Technologies". Aviation & Environment Summit 2006, Apr. 25-26, 2006. Geneva, Switzerland, pp. 1-17.
Hingorani S.S., "Towards a Quieter Future: Next frontier for Aircraft Engine Technologies". Aviation & Environment Summit 2006, Apr. 25-26, 2006. Geneva, Switzerland, pp. 5.
Holcombe, V. (2003). Aero-Propulsion Technology (APT) task V low noise ADP engine definition study. NASA CR-2003-212521. Oct. 1, 2003. pp. 1-73.
Honeywell Learjet 31 and 35/36 TFE731-2 to 2C Engine Upgrade Program. Sep. 2005. pp. 1-4.
Honeywell LF507. Jane's Aero-engines, Aero-engines- Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines- Turbofan. Jul. 18, 2012.
Horikoshi, S. and Serpone, N. (2013). Introduction to nanoparticles. Microwaves in nanoparticle synthesis. Wiley-VCH Verlag GmbH & Co. KGaA. pp. 1-24.
Howard, D.F. (1976). QCSEE preliminary under the wing flight propulsion system analysis report. NASA CR-134868. Feb. 1, 1976. pp. 1-260.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp.1-8.
Hughes C., "The promise and challenges of ultra high bypass ratio engine technology and integration/Ultra high by AIAA Aero Sciences Meeting", Jan. 4-7, 2011. p. 4.
Hughes C., "The Promsie and Challenges of Ultra High Bypass Ratio Engine Technology and Integration Ultra High AIAA Aero Sciences Meeting", Jan. 4-7, 2011, pp. 1-12.
International Search Report and Written Opinion for PCT Application No. PCT/US2014/056203, dated Oct. 9, 2014, 13 pages.
International Search Report for PCT Application No. PCT/US2013/075941, dated Apr. 15, 2014, 10 pages.
Internet print-out of "http://airinsight.com/2011/11/09/comparing-the-new-technology-narrow-body-engines-gtf-vs_leap-maintenance-costs/", published Nov. 9, 2011, 8 pages.
Ivchenko-Progress AI-727M. Jane's Aero-engines, Aero-engines- Turbofan. Nov. 27, 2011.
Ivchenko-Progress D-436. Jane's Aero-engines, Aero-engines- Turbofan. Feb. 8, 2012.
Ivchenko-Progress D-727. Jane's Aero-engines, Aero-engines- Turbofan. Feb. 7, 2007.
Jacobson, N.S. (1993). Corrosion of silicon-based ceramics in combustion environments. J. Am. Ceram. Soc. 76(1). pp. 3-28.

(56) References Cited

OTHER PUBLICATIONS

Jeng, Y.-L., Lavernia, E.J. (1994). Processing of molybdenum disilicide. J. of Mat. Sci. vol. 29. 1994. pp. 2557-2571.

Johnston, R.P. and Hemsworth, M.C. (1978). Energy efficient engine preliminary design and integration studies. Jun. 1, 1978. pp. 1-28.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.

Jorgensen, P.J., Wadsworth, M.E., and Cutler, I.B. (1961). Effects of water vapor on oxidation of silicon carbide. J. Am. Ceram. Soc. 44(6). pp. 248-261.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Kandebo, S.W. (1998). Geared-Turbofan engine design targets cost, complexity. Aviation Week & Space Technology, 148(8). p. 34-5.

Kandebo, S.W. (1998). Pratt & Whitney launches geared turbofan engine. Aviation Week & Space Technology, 148 (8). p. 32-4.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp 1-10.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Kerrebrock, J.L. (1977). Aircraft engines and gas turbines. Cambridge, MA: The MIT Press. p. 11.

European Search Report for European Patent Application No. 21196396.2 completed Dec. 13, 2021.

Summons to Attend Oral Proceedings for European Patent Application No. 14850031.7 (3052789) mailed Oct. 25, 2021.

Decision Revoking European Patent No. 3052789 (14850031.7) mailed Nov. 21, 2022.

\* cited by examiner

LOW PRESSURE RATIO FAN ENGINE HAVING A DIMENSIONAL RELATIONSHIP BETWEEN INLET AND FAN SIZE

CROSS-REFERENCE TO RELATED APPLICATIONS

This application is a continuation of U.S. patent application Ser. No. 15/887,183, filed Feb. 2, 2018, which is a continuation of U.S. patent application Ser. No. 14/091,862, filed Nov. 27, 2013, which claims priority to provisional application 61/884,325, filed on Sep. 30, 2013 and is a continuation-in-part of U.S. patent application Ser. No. 13/721,095, filed on Dec. 20, 2012.

BACKGROUND

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors and the turbine section includes low and high pressure turbines.

A nacelle surrounds the engine. An inlet section of the nacelle is that portion of the nacelle that is forward of the fan section of the engine. One function of the inlet is to reduce noise. A minimum length of the inlet is typically required for noise reduction with high bypass ratio engines.

While longer inlets tend to improve noise reduction, that feature does not come without cost. A longer inlet is associated with increased weight and external drag. Additionally, the airflow at the inlet during takeoff typically creates a bending moment that is proportional to the length of the inlet. Longer inlets, therefore, tend to introduce additional load on the engine structure under such conditions.

SUMMARY

A gas turbine engine assembly according to an exemplary aspect of the present disclosure includes, among other things, a fan including a plurality of fan blades, a diameter of the fan having a dimension D that is based on a dimension of the fan blades. Each fan blade has a leading edge and an inlet portion forward of the fan. A length of the inlet portion has a dimension L between a location of the leading edge of at least some of the fan blades and a forward edge on the inlet portion. A dimensional relationship of L/D is between about 0.2 and about 0.45.

In a further non-limiting embodiment of the foregoing assembly, the dimensional relationship of L/D is between about 0.25 and about 0.45.

In a further non-limiting embodiment of either of the foregoing assemblies, the dimensional relationship of L/D is between about 0.30 and about 0.40.

In a further non-limiting embodiment of any of the foregoing assemblies, the dimensional relationship of L/D is about 0.35.

In a further non-limiting embodiment of any of the foregoing assemblies, the dimension L is different at a plurality of locations on the fan case. A greatest value of L corresponds to a value of L/D that is at most about 0.45, and a smallest value of L corresponds to a value of L/D that is at least about 0.20.

In a further non-limiting embodiment of any of the foregoing assemblies, the dimension L varies and the dimensional relationship of L/D is based on an average value of L.

In a further non-limiting embodiment of any of the foregoing assemblies, the dimension L varies between a top of the inlet portion and a bottom of the inlet portion, and the dimensional relationship of L/D is based on a value of L near a midpoint between the top and the bottom of the inlet portion.

In a further non-limiting embodiment of any of the foregoing assemblies, the leading edges of the fan blades are in a reference plane, and the dimension L extends along a direction that is generally perpendicular to the reference plane.

In a further non-limiting embodiment of any of the foregoing assemblies, the engine has a central axis, the reference plane is generally perpendicular to the central axis, and the dimension L extends along a direction that is parallel to the central axis.

In a further non-limiting embodiment of any of the foregoing assemblies, the engine has a central axis, the forward edge on the fan case is in a reference plane, the leading edges of the fan blades are in a second reference plane, and the dimension L is measured between a first location where the central axis intersects the first reference plane and a second location where the central axis intersects the second reference plane.

In a further non-limiting embodiment of any of the foregoing assemblies, the fan is configured to deliver a portion of air into a compressor section and a portion of air into a bypass duct, a bypass ratio which is defined as a volume of air passing to the bypass duct compared to a volume of air passing into the compressor section being greater than or equal to about 8, and the fan is configured to have a pressure ratio between about 1.20 and about 1.50 when operating at sea level.

In a further non-limiting embodiment of any of the foregoing assemblies, each of the fan blades is a swept fan blade.

In a further non-limiting embodiment of any of the foregoing assemblies, a speed change device is configured to drive the fan at a speed that is less than an input speed in the speed change device.

In a further non-limiting embodiment of any of the foregoing assemblies, the speed change device is a geared architecture that defines a gear reduction ratio greater than or equal to about 2.3.

In a further non-limiting embodiment of any of the foregoing assemblies, a fan blade tip speed of each of the fan blades is less than about 1150 ft/second.

A gas turbine engine assembly according to an exemplary aspect of the present disclosure includes, among other things, a fan including a plurality of fan blades, a diameter of the fan having a dimension D that is based on a dimension of the fan blades, each fan blade having a leading edge, a geared architecture configured to drive the fan at a speed that is less than an input speed in the geared architecture, a compressor section, a turbine section configured to drive the compressor section and the geared architecture, an inlet portion forward of the fan, a length of the inlet portion having a dimension L between a location of the leading edge of at least some of the fan blades and a forward edge on the inlet portion. A dimensional relationship of L/D is between about 0.2 and about 0.45.

In a further non-limiting embodiment of the foregoing gas turbine engine assembly, the dimension L varies and the dimensional relationship of L/D is based on an average value of L.

In a further non-limiting embodiment of either of the foregoing gas turbine engines, the fan is configured to deliver a portion of air into the compressor section, and a portion of air into a bypass duct, a bypass ratio between a volume of air passing to the bypass duct and a volume of air passing into the compressor section is greater than or equal to about 8, and the fan is configured to have a pressure ratio less than about 1.50 when operating at sea level.

In a further non-limiting embodiment of any of the foregoing gas turbine engine assemblies, the geared architecture defines a gear reduction ratio greater than or equal to about 2.3.

In a further non-limiting embodiment of any of the foregoing gas turbine engine assemblies, each of the fan blades is a swept fan blade.

The various features and advantages of at least one disclosed example embodiment will become apparent to those skilled in the art from the following detailed description. The drawings that accompany the detailed description can be briefly described as follows.

DETAILED DESCRIPTION

Figure 1:
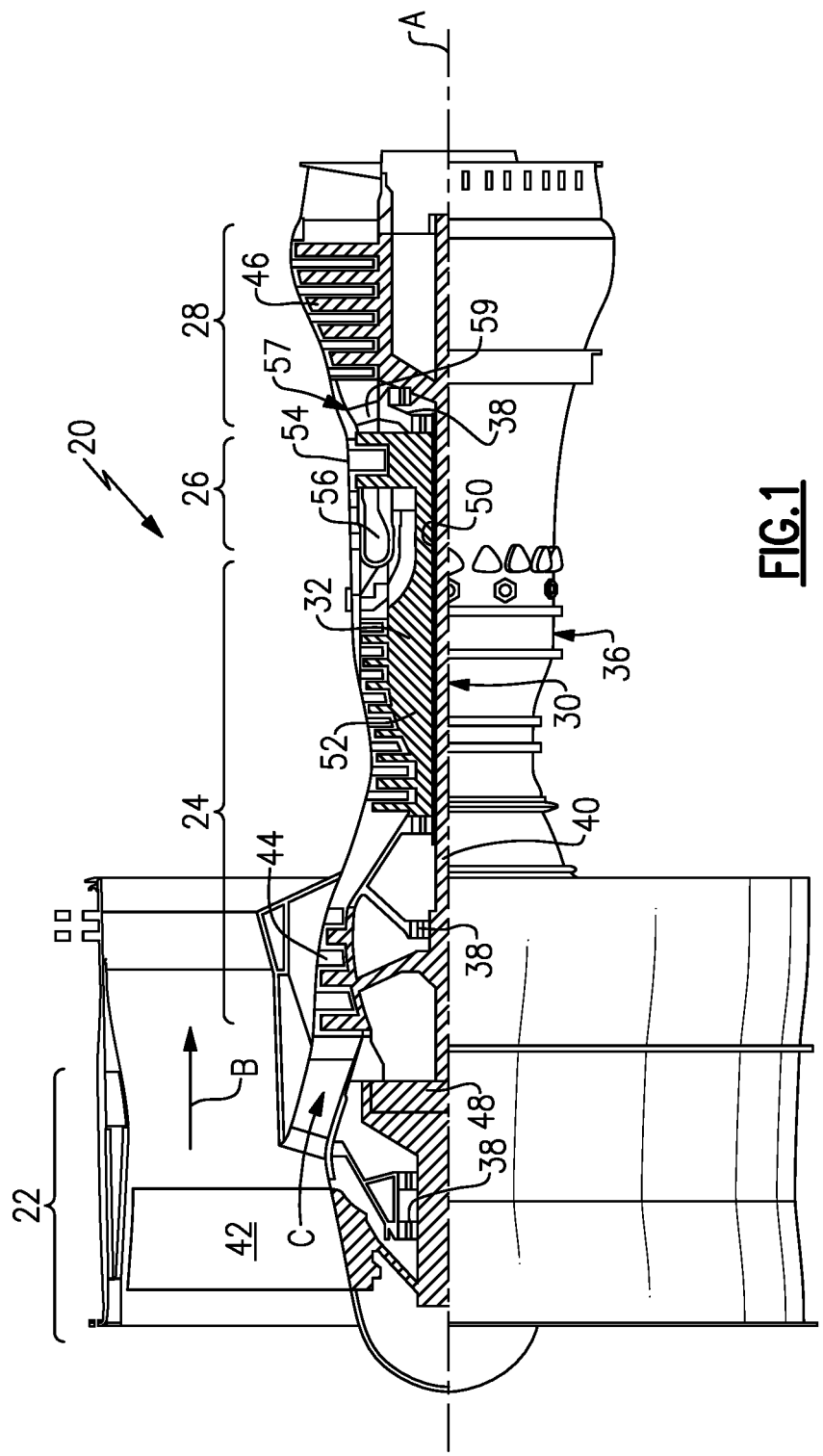
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed", as disclosed herein according to one non-limiting embodiment, is less than about 1150 ft/second.

Figure 2:
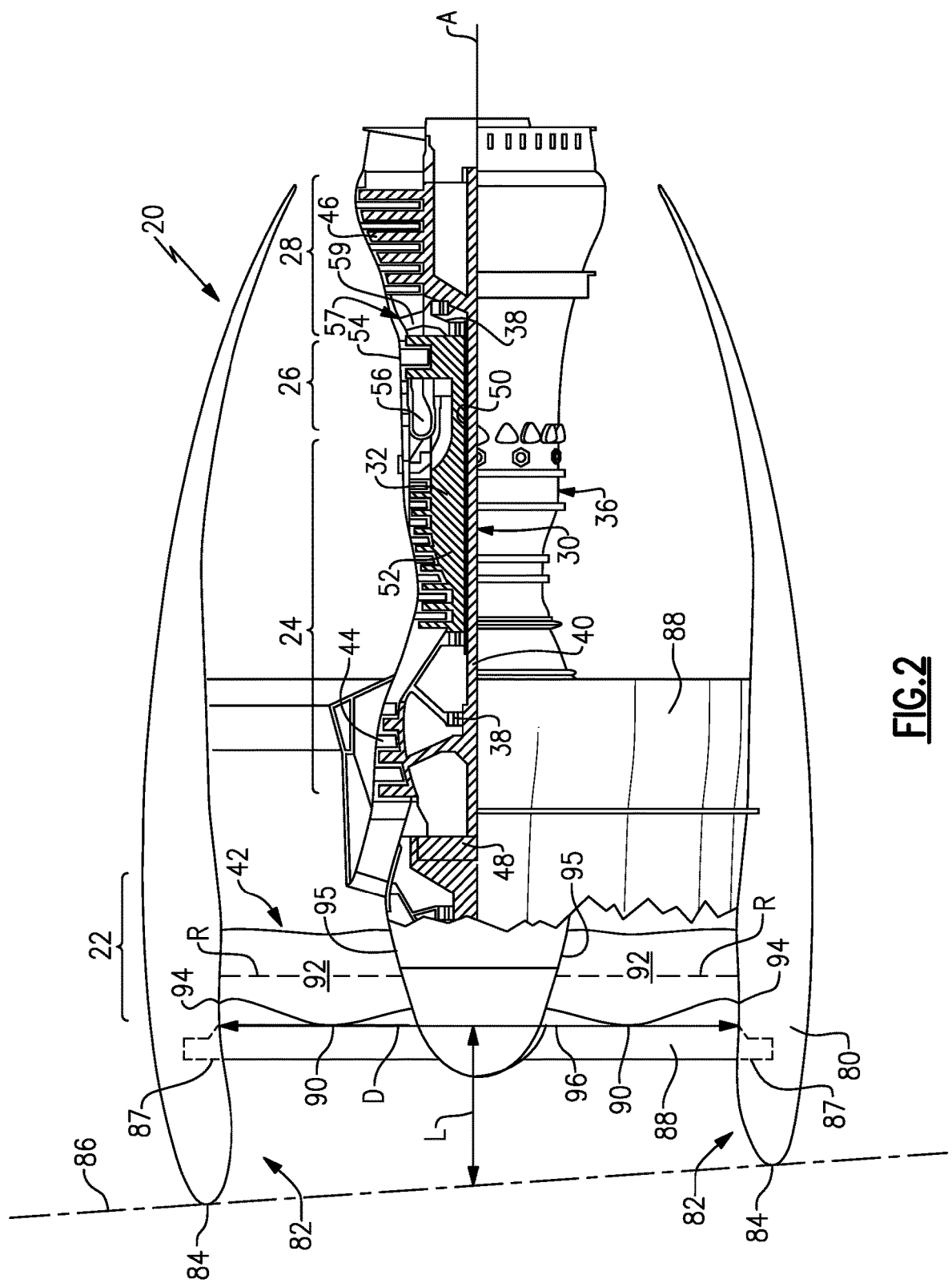
FIG. 2 schematically illustrates selected portions of the example gas turbine engine and demonstrates an example dimensional relationship designed according to an embodiment of this invention.

FIG. 2 illustrates an example embodiment of the engine 20 with a nacelle or cowling 80, that surrounds the entire engine. In this disclosure, like reference numerals designate like elements where appropriate and reference numerals with the addition of one-hundred or multiples thereof designate modified elements that are understood to incorporate the same features and benefits of the corresponding original elements. An inlet portion 82 is situated forward of the fan 42. In this example, the inlet portion 82 has a leading edge 84, which may be defined by the inlet side cut on the cowling 80. The leading edge 84 is generally within a first reference plane 86.

The nacelle 80 in some examples includes a flange 87 that is received against a leading edge on a fan case 88. The inlet portion 82 has a length L between a selected location corresponding to the leading edge 84, such as a location within the reference plane 86, and a forward most portion 90 on leading edges on the fan blades 92 of the fan 42. In this example, the length L may be considered an axial length of the inlet portion 82 because the length L is taken along a direction parallel to the central longitudinal axis A of the engine 20. In the illustrated example, the inlet section of the nacelle 80 and the section of the fan case 88 that is forward of the blades 92 collectively establish the overall effective length L. In other words, in this example the length L of the inlet portion 82 includes the length of the inlet section of the nacelle 80 and some of the fan case 88.

Figure 4:
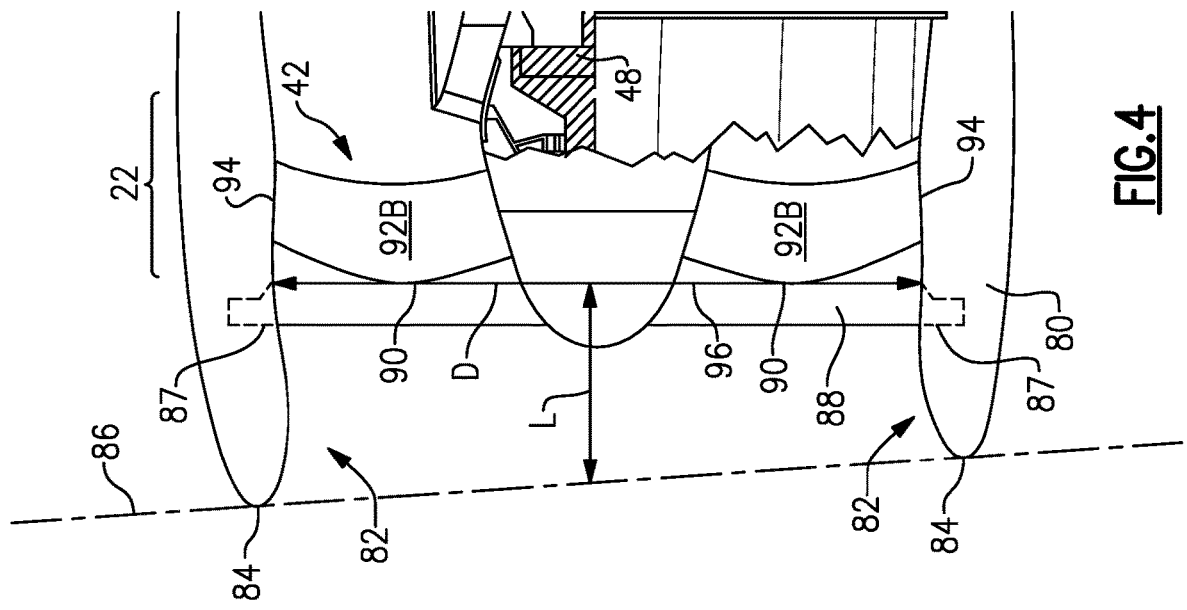
FIG. 4 schematically illustrates selected portions of a third example of a gas turbine engine.
Figure 3:
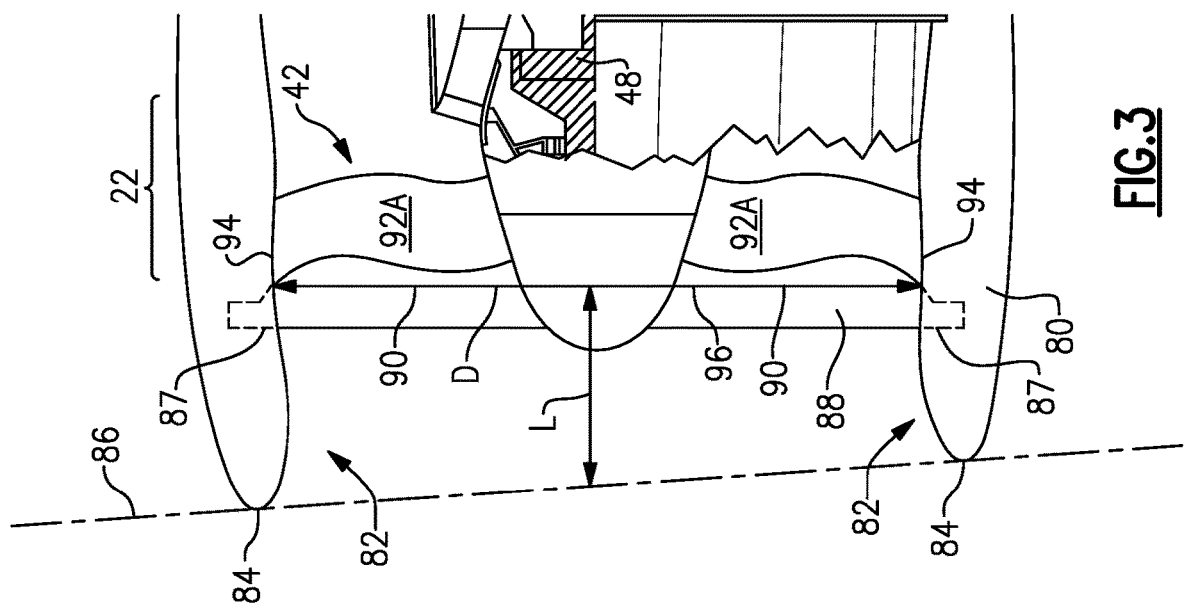
FIG. 3 schematically illustrates selected portions of a second example of a gas turbine engine.

The fan blades can be unswept fan blades 42 (shown in FIG. 1) or swept fan blades 92 (shown in FIGS. 2-4). In some examples, the fan blades 92 are conventional radial fan blades or three-dimensional swept fan blades (each having a similar side profile shown in FIG. 2). In some examples, the fan blades 92 are forward-swept fan blades 92A (shown in FIG. 3). In other examples, the fan blades 92 are rearward-swept fan blades 92B (shown in FIG. 4). In further examples, the fan blades 92 include both forward-swept and rearward-swept portions (shown in FIG. 2). A forward-swept fan blade is configured to have a radial portion of a leading edge of the fan blade forward of other portions of the leading edge. A rearward-swept fan blade is configured to have a radial portion of a leading edge of the fan blade rearward of other portions of the leading edge. A three-dimensional swept fan blade is twisted about an axis R extending in a radial direction between a tip or outermost edge 94 and a root 95 of the fan blade (shown in an axial view in FIG. 2).

The fan blades 92 establish a diameter between circumferentially outermost edges 94. The fan diameter D is shown in FIG. 2 as a dimension extending between the edges 94 of two of the fan blades 92 that are parallel to each other and extending in opposite directions away from the central axis A. In the illustration, the forward most portions 90 on the fan blades 92 are within a second reference plane 96. In this example, the second reference plane 96 is oriented generally perpendicular to the central axis A of the engine 20. The first reference plane 86 in this example is oriented at an oblique angle relative to the second reference plane 96 and the central axis A. In the illustrated example the oblique angle of orientation of the first reference plane 86 is approximately 5°.

The length L is selected to establish a desired dimensional relationship between L and D. In some example embodiments, the dimensional relationship of L/D (e.g., the ratio of L/D) is between about 0.2 and about 0.45. In some example embodiments, the dimensional relationship of L/D is between about 0.25 and about 0.45. In some examples L/D is between about 0.30 and about 0.40. In some example embodiments, the dimensional relationship of L/D is about 0.35.

As can be appreciated from FIG. 2, the length L of the inlet portion 82 (i.e., the combined length of the nacelle inlet and the forward section of the fan case) is different at different locations along a perimeter of the fan case 80. The leading edge 84 is further from the second reference plane 96 near the top (according to the drawing) of the engine assembly than it is near the bottom (according to the drawing) of the engine assembly. The greatest length L in this example corresponds to a value for L/D that is no more than about 0.45. The smallest length L in the illustrated example corresponds to a value for L/D that is at least about 0.20. The value of L/D may vary between those two limits at different locations on the leading edge 84.

In one example where the leading edge 84 has a variable distance from the second reference plane 96, the dimensional relationship L/D is taken based upon a measurement of L that corresponds to an average measurement of the dimension between the leading edge 84 of the inlet portion 82 and the average location of the leading edge on the fan blades 92. Stated another way, L/D in such an embodiment is based on a measurement of the average distance between the reference planes 86 and 96. In another example where the dimension between the first reference plane 86 and the second reference plane 96 varies, the dimension L used for the dimensional relationship L/D is taken at a midpoint between a portion of the leading edge 84 that is most forward and another portion of the leading edge 84 that is most aft.

In another example, the dimension L is measured between a first location where the central longitudinal axis A of the engine intersects the first reference plane 86 and a second location where the axis A intersects the second reference plane 96.

The dimensional relationship of L/D is smaller than that found on typical gas turbine engines. The corresponding dimensional relationship on most gas turbine engines is greater than 0.5. Providing a shorter inlet portion length L facilitates reducing the weight of the engine assembly. A shorter inlet portion length also reduces the overall length of the nacelle and reduces external drag. Additionally, having a shorter inlet portion 82 reduces the bending moment and corresponding load on the engine structure during flight conditions, such as takeoff. A shorter inlet portion 82 also can contribute to providing more clearance with respect to cargo doors and other mechanical components in the vicinity of the engine.

The example engine 20 is a high bypass ratio engine having a larger fan with respect to the engine core components and lower exhaust stream velocities compared to engines with lower bypass ratios. Higher bypass ratio engines tend to have fan noise as a more significant source of noise compared to other sources. The illustrated example includes a shorter inlet yet does not have an associated effective perceived noise level that is noticeably greater than other configurations with longer inlets. One reason for this is that the example engine 20 includes a low pressure ratio fan that operates at a slower fan speed, which is associated with less fan noise. In one example, the fan 42 has a pressure ratio between about 1.20 and about 1.50. A pressure ratio within that range corresponds to the engine operating at a cruise design point in some example implementations and/or at sea level in other example implementations. The shorter length L of the inlet portion 82 combined with the low pressure ratio of the fan 42, which has a slower fan speed enabled by the geared architecture 48 of the engine 20, results in an acceptable perceived engine noise level. Additionally, the geared architecture 48 enables the fan 42 to rotate at a slower speed and a lower fan tip relative Mach number which is associated with a reduced fan noise signature. In some instances, the geared architecture 48 reduces the fan tip relative Mach number below 1.1 at the critical condition for noise attenuation, such as at full-takeoff, and in some instances, into the sub-sonic range at Mach 1.0 and below. Less acoustic liner material is necessary to maintain acceptable noise attenuation control because of the reduced fan source noise.

Utilizing a dimensional relationship as described above allows for realizing a relatively shorter inlet on a gas turbine engine while maintaining sufficient noise attenuation control. Additionally, the short inlet portion 82 combined with the low pressure ratio fan 42 provides improved propulsive efficiency and lower installed fuel burn compared to conventional gas turbine engine propulsion systems.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine assembly, comprising:
    a fan section including a fan and a fan case surrounding the fan to define a bypass duct, the fan including a plurality of fan blades having circumferentially outermost edges, a diameter of the fan having a dimension D extending between the circumferentially outermost edges of the fan blades, each fan blade having a leading edge, a forward-most portion on the leading edges of the fan blades in a first reference plane, wherein a portion of the fan case is forward of the leading edges of the fan blades relative to an engine central longitudinal axis, and each of the fan blades is a swept fan blade;
    a geared architecture;
    a compressor section including a first compressor and a second compressor axially aft of the first compressor relative to the engine central longitudinal axis;
    a turbine section including a first turbine and a fan drive turbine, wherein each of the first compressor and the fan drive turbine includes a greater number of stages than the first turbine;
    a nacelle including an inlet portion forward of the fan relative to the engine central longitudinal axis, a forward edge on the inlet portion in a second reference plane, and a length of the inlet portion having a dimension L measured along the engine central longitudinal axis between the first reference plane and the second reference plane;
    wherein the fan delivers a portion of air into the compressor section and a portion of air into the bypass duct, and a bypass ratio of greater than 10, the bypass ratio being a ratio of a volume of air passing to the bypass duct compared to a volume of air passing into the compressor section;
    a first shaft concentric with a second shaft, the first and second shafts rotatable about the engine central longitudinal axis, wherein the first shaft connects the fan and the first compressor to the fan drive turbine, the second shaft connects the second compressor to the first turbine, and the first shaft drives the fan through the geared architecture; and
    wherein a dimensional relationship of L/D is between 0.30 and 0.40.

2. The gas turbine engine assembly as recited in claim 1, wherein the fan has a pressure ratio of between 1.20 and 1.50 across the fan blade alone at cruise at 0.8 Mach and 35,000 feet.

3. The gas turbine engine assembly as recited in claim 2, wherein the swept fan blade includes a rearward swept portion.

4. The gas turbine engine assembly as recited in claim 2, wherein the swept fan blade includes a forward swept portion.

5. The gas turbine engine assembly as recited in claim 4, wherein the swept fan blade includes a rearward swept portion.

6. The gas turbine engine assembly as recited in claim 2, wherein the geared architecture includes an epicyclical gear train.

7. The gas turbine engine assembly as recited in claim 6, wherein the second reference plane is oriented at an oblique angle relative to the engine central longitudinal axis.

8. The gas turbine engine assembly as recited in claim 7, wherein the pressure ratio of the fan is less than 1.45 across the fan blade alone at cruise at 0.8 Mach and 35,000 feet.

9. The gas turbine engine assembly as recited in claim 8, further comprising a fan tip relative Mach number below 1.1 at full-takeoff.

10. The gas turbine engine assembly as recited in claim 9, wherein the first turbine includes two stages.

11. The gas turbine engine assembly as recited in claim 10, wherein the forward edge on the inlet portion is further from the first reference plane near a top of the gas turbine engine assembly than the forward engine is near a bottom of the gas turbine engine assembly.

12. The gas turbine engine assembly as recited in claim 6, wherein the pressure ratio of the fan is less than 1.45 across the fan blade alone at cruise at 0.8 Mach and 35,000 feet.

13. The gas turbine engine assembly as recited in claim 12, wherein the first turbine includes two stages.

14. The gas turbine engine assembly as recited in claim 13, wherein the geared architecture defines a gear reduction ratio of greater than 2.3.

15. The gas turbine engine assembly as recited in claim 14, wherein the first compressor is a three-stage compressor.

16. The gas turbine engine assembly as recited in claim 14, further comprising a fan tip relative Mach number below 1.1 at full-takeoff.

17. The gas turbine engine assembly as recited in claim 16, wherein the fan drive turbine includes an inlet, an outlet, and a pressure ratio of greater than 5:1, where the pressure ratio is pressure measured prior to the inlet as related pressure measured at the outlet prior to any exhaust nozzle.

18. The gas turbine engine assembly as recited in claim 17, wherein the epicyclical gear train includes a star gear system.

19. The gas turbine engine assembly as recited in claim 17, wherein the epicyclical gear train includes a planetary gear system.

20. The gas turbine engine assembly as recited in claim 19, wherein the gas turbine engine assembly is a two-spool engine including a first spool and a second spool, the first spool comprises the first compressor and the fan drive turbine, and the second spool comprises the second compressor and the first turbine.

21. The gas turbine engine assembly as recited in claim 20, wherein the fan tip relative Mach number is equal to or below 1.0 at full-takeoff.

22. The gas turbine assembly as recited in claim 21, wherein the dimensional relationship of L/D is between 0.30 and 0.35.

23. The gas turbine assembly as recited in claim 21, wherein the dimensional relationship of L/D is between 0.35 and 0.40.

24. The gas turbine engine assembly as recited in claim 21, wherein:
the turbine section includes a mid-turbine frame between the first turbine and the fan drive turbine relative to the engine central longitudinal axis;
the mid-turbine frame supports bearing systems in the turbine section; and
the mid-turbine frame includes a plurality of vanes in a core airflow path defined by the turbine section.

25. The gas turbine engine assembly as recited in claim 24, wherein the second reference plane is oriented at an oblique angle relative to the engine central longitudinal axis.

26. The gas turbine assembly as recited in claim 24, wherein the fan drive turbine includes a greater number of stages than the first compressor.

27. The gas turbine assembly as recited in claim 24, wherein the first compressor is a three-stage compressor.

28. The gas turbine engine assembly as recited in claim 24, wherein the plurality of vanes are inlet guide vanes arranged to set airflow in the core airflow path entering the fan drive turbine.

29. The gas turbine assembly as recited in claim 28, wherein the dimensional relationship of L/D is between 0.30 and 0.35.

30. The gas turbine assembly as recited in claim 28, wherein the dimensional relationship of L/D is between 0.35 and 0.40.

* * * * *